(12) United States Patent
Mishima et al.

(10) Patent No.: US 11,461,438 B2
(45) Date of Patent: Oct. 4, 2022

(54) INFORMATION PROCESSING APPARATUS AND NON-TRANSITORY COMPUTER READABLE MEDIUM FOR SETTING PERSONAL INFORMATION ON FIRST USER AS PRESENT SETTING WHILE ALLOWING SECOND USER TO INTERRUPT

(71) Applicant: FUJIFILM BUSINESS INNOVATION CORP., Tokyo (JP)

(72) Inventors: Tatsuo Mishima, Kanagawa (JP); Tomoaki Hirano, Kanagawa (JP); Tomonori Tanaka, Kanagawa (JP); Manabu Hayashi, Kanagawa (JP); Rie Muraishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 225 days.

(21) Appl. No.: 16/547,663

(22) Filed: Aug. 22, 2019

(65) Prior Publication Data

US 2020/0311229 A1 Oct. 1, 2020

(30) Foreign Application Priority Data

Mar. 25, 2019 (JP) .............................. JP2019-055923

(51) Int. Cl.
 *G06F 21/31* (2013.01)
(52) U.S. Cl.
 CPC .................................. *G06F 21/31* (2013.01)
(58) Field of Classification Search
 CPC ............. G06F 21/31; G06F 2221/2143; G06F 2221/2147; G06F 21/6245
 See application file for complete search history.

(56) References Cited

U.S. PATENT DOCUMENTS

| | | | |
|---|---|---|---|
| 8,566,712 B1* | 10/2013 | Varian | G06F 16/9535 715/742 |
| 9,438,593 B2* | 9/2016 | Cheon | H04L 67/10 |
| 9,965,797 B1* | 5/2018 | Poole | G06Q 30/0639 |
| 10,055,555 B2 | 8/2018 | Hosoda | |
| 11,099,652 B2* | 8/2021 | Osotio | G06F 3/017 |
| 11,107,128 B1* | 8/2021 | Hazlewood | G06Q 30/0268 |
| 2002/0131069 A1* | 9/2002 | Wanda | G06F 3/121 358/1.14 |

(Continued)

FOREIGN PATENT DOCUMENTS

| JP | 2015-007893 A | 1/2015 |
|---|---|---|
| JP | 2016-173659 A | 9/2016 |

*Primary Examiner* — Aravind K Moorthy
(74) *Attorney, Agent, or Firm* — Oliff PLC

(57) ABSTRACT

An information processing apparatus includes a unit that sets personal setting information on a first user in a present setting on the information processing apparatus, the present setting related to personal setting information that is information determined for and used by each user, a unit that determines whether a second user is about to use the information processing apparatus during a time period throughout which the personal setting information on the first user is set in the present setting on the information processing apparatus, and a unit that removes at least part of the personal setting information on the first user from the present setting in response to a determination indicating that the second user is about to use the information processing apparatus during the time period.

21 Claims, 6 Drawing Sheets

(56) References Cited

U.S. PATENT DOCUMENTS

| | | | |
|---|---|---|---|
| 2004/0156068 A1* | 8/2004 | Yoshida | G06F 21/608 358/1.13 |
| 2007/0039061 A1* | 2/2007 | Koo | G06F 21/575 726/34 |
| 2007/0147870 A1* | 6/2007 | Shindo | G03G 15/5012 399/82 |
| 2008/0015878 A1* | 1/2008 | Feng | G06Q 30/02 705/1.1 |
| 2008/0027569 A1* | 1/2008 | Okigami | G06F 3/1247 700/83 |
| 2009/0070604 A1* | 3/2009 | Kumakura | G06F 1/3215 713/310 |
| 2009/0231619 A1* | 9/2009 | Takahashi | G06F 21/608 358/1.15 |
| 2009/0296997 A1* | 12/2009 | Rocheford | G06F 21/35 382/124 |
| 2009/0325630 A1* | 12/2009 | Tiitola | H04L 67/303 455/550.1 |
| 2010/0005463 A1* | 1/2010 | Chang | G06F 9/44505 717/178 |
| 2010/0020345 A1* | 1/2010 | Achiwa | G06F 21/608 358/1.14 |
| 2010/0058077 A1* | 3/2010 | Matsuda | G06F 21/78 713/194 |
| 2010/0311391 A1* | 12/2010 | Siu | H04W 8/205 455/411 |
| 2012/0092713 A1* | 4/2012 | Hagiwara | G06F 3/1222 358/1.15 |
| 2012/0135684 A1* | 5/2012 | Shrum, Jr | H04N 21/25866 455/41.2 |
| 2013/0041653 A1* | 2/2013 | Tseng | G06F 16/90324 704/9 |
| 2013/0152506 A1* | 6/2013 | Pradeep | G06Q 30/0268 53/131.2 |
| 2013/0166106 A1* | 6/2013 | Nakagawa | G06F 17/00 701/2 |
| 2013/0254741 A1* | 9/2013 | Spassov | G06F 8/71 717/110 |
| 2013/0298066 A1* | 11/2013 | Kim | G06F 3/0484 715/773 |
| 2013/0325927 A1* | 12/2013 | Corbett | G06F 16/2453 709/203 |
| 2014/0173716 A1* | 6/2014 | Manipatruni | G06F 21/35 726/17 |
| 2014/0240089 A1* | 8/2014 | Chang | G06Q 20/3223 340/5.61 |
| 2014/0257808 A1* | 9/2014 | Gil | G10L 15/22 704/235 |
| 2014/0282131 A1* | 9/2014 | Castro | G06F 8/38 715/763 |
| 2014/0335480 A1* | 11/2014 | Asenjo | G06Q 10/06 434/107 |
| 2014/0380505 A1* | 12/2014 | Camacho | G06F 21/31 726/28 |
| 2015/0062612 A1* | 3/2015 | Nishii | H04N 1/4433 358/1.14 |
| 2015/0089122 A1* | 3/2015 | Oyama | G06F 12/0246 711/103 |
| 2015/0112816 A1* | 4/2015 | Collier | G06Q 30/0277 705/14.69 |
| 2015/0149923 A1* | 5/2015 | Shogaki | G06F 21/6245 715/747 |
| 2015/0229809 A1* | 8/2015 | Fujii | H04N 1/00973 358/1.16 |
| 2015/0261481 A1* | 9/2015 | Takenaka | H04N 1/0035 358/1.15 |
| 2015/0264199 A1* | 9/2015 | Mizuno | H04N 1/4406 358/1.16 |
| 2015/0317357 A1* | 11/2015 | Harmsen | G06F 16/245 707/723 |
| 2015/0332062 A1* | 11/2015 | McReynolds | H04W 4/12 726/28 |
| 2016/0080685 A1* | 3/2016 | De Saint Salvy | H04N 5/91 386/285 |
| 2016/0148015 A1* | 5/2016 | Weast | G06F 21/84 726/28 |
| 2016/0261771 A1* | 9/2016 | Fujii | H04N 1/4413 |
| 2016/0274822 A1* | 9/2016 | Iwasaki | G06F 3/1288 |
| 2016/0291910 A1* | 10/2016 | Tanaka | G06F 3/1203 |
| 2017/0040002 A1* | 2/2017 | Basson | G06F 21/84 |
| 2017/0155794 A1* | 6/2017 | Sei | G06F 3/1231 |
| 2017/0199874 A1* | 7/2017 | Patel | H04W 4/023 |
| 2018/0032416 A1* | 2/2018 | McCarty | G06F 1/273 |
| 2018/0069900 A1* | 3/2018 | Dunne | H04L 63/145 |
| 2018/0129276 A1* | 5/2018 | Nguyen | G06F 3/011 |
| 2018/0225743 A1* | 8/2018 | Poole | G06Q 30/0631 |
| 2018/0284678 A1* | 10/2018 | Miyamoto | G06F 3/1296 |
| 2018/0288115 A1* | 10/2018 | Asnis | H04L 67/18 |
| 2018/0288116 A1* | 10/2018 | Asnis | H04L 65/602 |
| 2018/0307446 A1* | 10/2018 | Kaneko | G06F 3/1255 |
| 2018/0352294 A1* | 12/2018 | Compton | H04N 21/47217 |
| 2019/0052615 A1* | 2/2019 | Auvenshine | H04L 63/068 |
| 2019/0121522 A1* | 4/2019 | Davis | H04N 9/3185 |
| 2019/0202399 A1* | 7/2019 | Troia | H04W 12/08 |
| 2019/0220179 A1* | 7/2019 | Della Vecchia | B60K 37/00 |
| 2019/0243588 A1* | 8/2019 | Nishiyama | H04N 1/4532 |
| 2019/0243592 A1* | 8/2019 | Nakajima | G06F 21/608 |
| 2019/0250862 A1* | 8/2019 | Sueshige | G06F 3/1286 |
| 2019/0289011 A1* | 9/2019 | Kamiya | G06F 16/122 |
| 2019/0312987 A1* | 10/2019 | Ketsuka | H04N 1/00514 |
| 2019/0324610 A1* | 10/2019 | Green | H04N 21/4532 |
| 2019/0325067 A1* | 10/2019 | Vaughn | G06F 16/7844 |
| 2019/0325156 A1* | 10/2019 | Du | G06F 16/435 |
| 2020/0067855 A1* | 2/2020 | Leminen | H04L 65/1069 |
| 2020/0082815 A1* | 3/2020 | Haze | G06N 20/00 |
| 2020/0195792 A1* | 6/2020 | Mizuno | H04N 1/0097 |
| 2020/0228534 A1* | 7/2020 | Chen | G06F 8/71 |
| 2020/0363920 A1* | 11/2020 | Ignatyev | G06F 3/0484 |
| 2021/0021602 A1* | 1/2021 | Munn | H04L 63/08 |
| 2021/0045169 A1* | 2/2021 | Pupakdee | H04L 9/3271 |

* cited by examiner

INFORMATION PROCESSING APPARATUS AND NON-TRANSITORY COMPUTER READABLE MEDIUM FOR SETTING PERSONAL INFORMATION ON FIRST USER AS PRESENT SETTING WHILE ALLOWING SECOND USER TO INTERRUPT

CROSS-REFERENCE TO RELATED APPLICATIONS

This application is based on and claims priority under 35 USC 119 from Japanese Patent Application No. 2019-055923 filed Mar. 25, 2019.

BACKGROUND

(i) Technical Field

The present disclosure relates to an information processing apparatus and a non-transitory computer readable medium.

(ii) Related Art

Techniques related to personal setting information that is personally used and determined on a per user basis are disclosed. Japanese Unexamined Patent Application Publication No. 2016-173659 discloses a system in which an information processing apparatus acquires, from a management apparatus, personalized setting information being an example of personal setting information and uses the acquired setting information. According to the disclosure, the system has an interrupt function that allows a second user to log in on the information processing apparatus while a first user has logged in on the information processing apparatus. Japanese Unexamined Patent Application Publication No. 2015-007893 also discloses an apparatus that has a personalizing function.

As disclosed in Japanese Unexamined Patent Application Publication No. 2016-173659, the information processing apparatus has a function that allows each user to use the personal setting information on a per user basis and a function that allows each user to interrupt the information processing apparatus.

If the information processing apparatus is used in an interrupt operation by a second user while all the personal setting information on a first user is set as the present setting on the information processing apparatus, there is a possibility that secret information included in the personal setting information on the first user is leaked to the second user. The personal setting information convenient for the first user to use the information processing apparatus may be inconvenient to the second user.

SUMMARY

Aspects of non-limiting embodiments of the present disclosure relate to allowing a second user to use an information processing apparatus with part of personal setting information on a first user excluded from a present setting even during a time period throughout which the personal setting information on the first user is set as the present setting on the information processing apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus. The information processing apparatus includes a unit that sets personal setting information on a first user in a present setting on the information processing apparatus, the present setting related to personal setting information that is information determined for and used by each user, a unit that determines whether a second user is about to use the information processing apparatus during a time period throughout which the personal setting information on the first user is set in the present setting on the information processing apparatus, and a unit that removes at least part of the personal setting information on the first user from the present setting in response to a determination indicating that the second user is about to use the information processing apparatus during the time period.

BRIEF DESCRIPTION OF THE DRAWINGS

Exemplary embodiment of the present disclosure will be described in detail based on the following figures, wherein.

DETAILED DESCRIPTION

Figure 1:
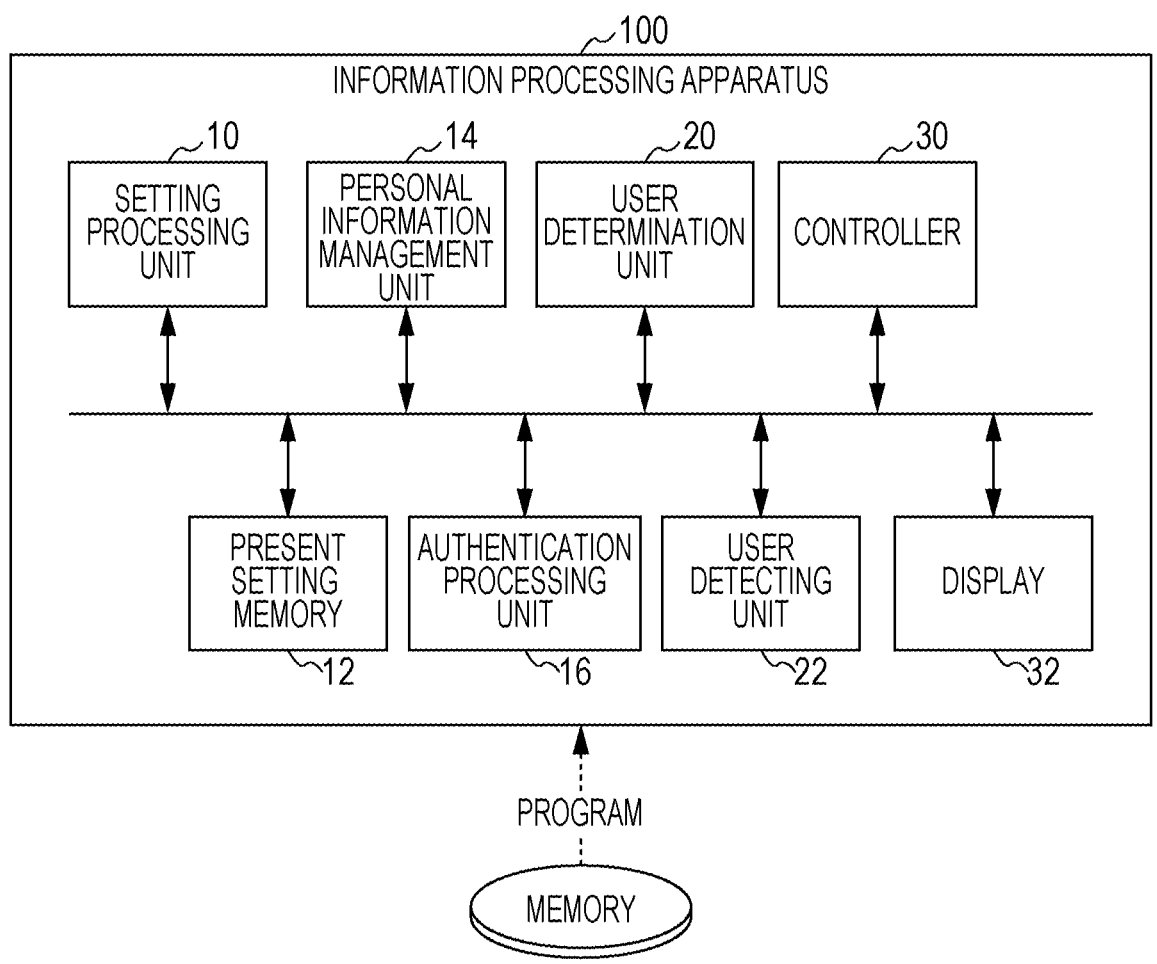
FIG. 1 specifically illustrates an information processing apparatus.

FIG. 1 illustrates an information processing apparatus 100 as a specific example of the exemplary embodiment of the disclosure. Referring to FIG. 1, the information processing apparatus 100 includes a setting processing unit 10, user determination unit 20, and controller 30. Referring to FIG. 1, the information processing apparatus 100 may further include a present setting memory 12, personal information management unit 14, authentication processing unit 16, user detecting unit 22, and display 32.

The setting processing unit 10 performs a process for a present setting on the information processing apparatus 100. The present setting on the information processing apparatus 100 is present setting information used by the information processing apparatus 100. In the example in FIG. 1, the setting information serving as a present setting on the information processing apparatus 100 is stored on the present setting memory 12.

The setting information in the present setting on the information processing apparatus 100 includes personal setting information. Setting information in a present setting, such as the personal setting information that is personally used and determined on a per user basis is stored on the present setting memory 12. The present setting memory 12 may be implemented by a memory device, such as a semiconductor memory. The present setting memory 12 may also be implemented by a memory device other than the semiconductor memory.

The personal information management unit 14 manages the personal setting information personally used and determined on a per user basis. For example, the personal information management unit 14 stores and manages multiple pieces of the personal setting information for multiple users. For example, from a management server external to the information processing apparatus 100, the personal information management unit 14 may acquire the personal setting information on a user who uses the information processing apparatus 100.

The authentication processing unit 16 performs an authentication operation on a user who uses the information processing apparatus 100. The authentication processing unit 16 performs the authentication operation by comparing input information for authentication from the user who wants to use the information processing apparatus 100 with pre-registered authentication information. The authentication processing unit 16 thus determines whether the user is a pre-registered and authorized user having the right to use the information processing apparatus 100. The authentication processing unit 16 may acquire the pre-registered authentication information from an authentication server external to the information processing apparatus 100.

The user determination unit 20 determines whether a second user is about to use the information processing apparatus 100 during a time period throughout which the personal setting information on a first user is set in a present setting on the information processing apparatus 100. In the specific example in FIG. 1, the user determination unit 20 determines whether the second user is about to use the information processing apparatus 100 during the time period throughout which the personal setting information on the first user remains stored in the present setting on the present setting memory 12. The user determination unit 20 may perform this determination by using detection results provided by the user detecting unit 22.

The user detecting unit 22 detects feature information unique to the user from the user who is about to use the information processing apparatus 100. For example, the user detecting unit 22 detects the feature information on the user from the user who is present within an area serving as a detection target set around the information processing apparatus 100. The feature information on the user approaching the information processing apparatus 100 is thus detected. When the user detecting unit 22 has detected the feature information on a user different from the first user, the user determination unit 20 determines that the second user is about to use the information processing apparatus 100.

The controller 30 controls the whole information processing apparatus 100 in FIG. 1. The controller 30 performs control to remove from the present setting at least part of the personal setting information set in the present setting on the information processing apparatus 100. The controller 30 performs control in accordance with a variety of programs. For example, the controller 30 may be implemented by using an arithmetic processing device, such a central processing unit (CPU) or a processor.

The display 32 displays a screen image, such as a user interface image for the user who uses the information processing apparatus 100 illustrated in FIG. 1. The display 32 may be a liquid-crystal display or an organic electro-luminescence (EL) display.

The information processing apparatus 100 in FIG. 1 may include one or more computers. The computer includes hardware resources. The hardware resources include an arithmetic device, such as a CPU, a memory device, such as hard disk or a storage device, a communication device that uses a communication network, such as the Internet, a device that reads data from or writes data to an optical disk or a semiconductor memory or a memory card, a display device, and an operation device that receives an operation of the user.

A program (software) corresponding to functions of one or more of the elements of the information processing apparatus 100 in FIG. 1 is installed onto a computer. The hardware resources of the computer and installed software work in cooperation and the computer thus implements one or more of the elements of the information processing apparatus 100 in FIG. 1. The program may be delivered to the computer (the information processing apparatus 100) via a communication network, such as the Internet or by using an optical disk, a semiconductor memory, or a card memory, each having stored the program.

The specific example of the information processing apparatus 100 in FIG. 1 includes a mobile terminal apparatus, such as a smart phone or a tablet terminal. The information processing apparatus 100 in FIG. 1 may be a personal computer.

An image processing apparatus having the functions of the information processing apparatus 100 in FIG. 1 may be implemented. The image processing apparatus may be a multi-function apparatus having multiple image output functions (one or more of a print function, scanner function, copying function, and fax function). For example, if the image processing apparatus having the functions of the information processing apparatus 100 in FIG. 1 is a multi-function apparatus, the image processing apparatus may be installed in a company office or school and used by customers thereof or may be installed in a convenience store and used by a large number of customers.

The whole configuration of the information processing apparatus 100 in FIG. 1 has been described. The specific process performed by the information processing apparatus 100 is described. In the following discussion, the elements in FIG. 1 are described by referring to the reference numerals thereof in FIG. 1.

Figure 2:
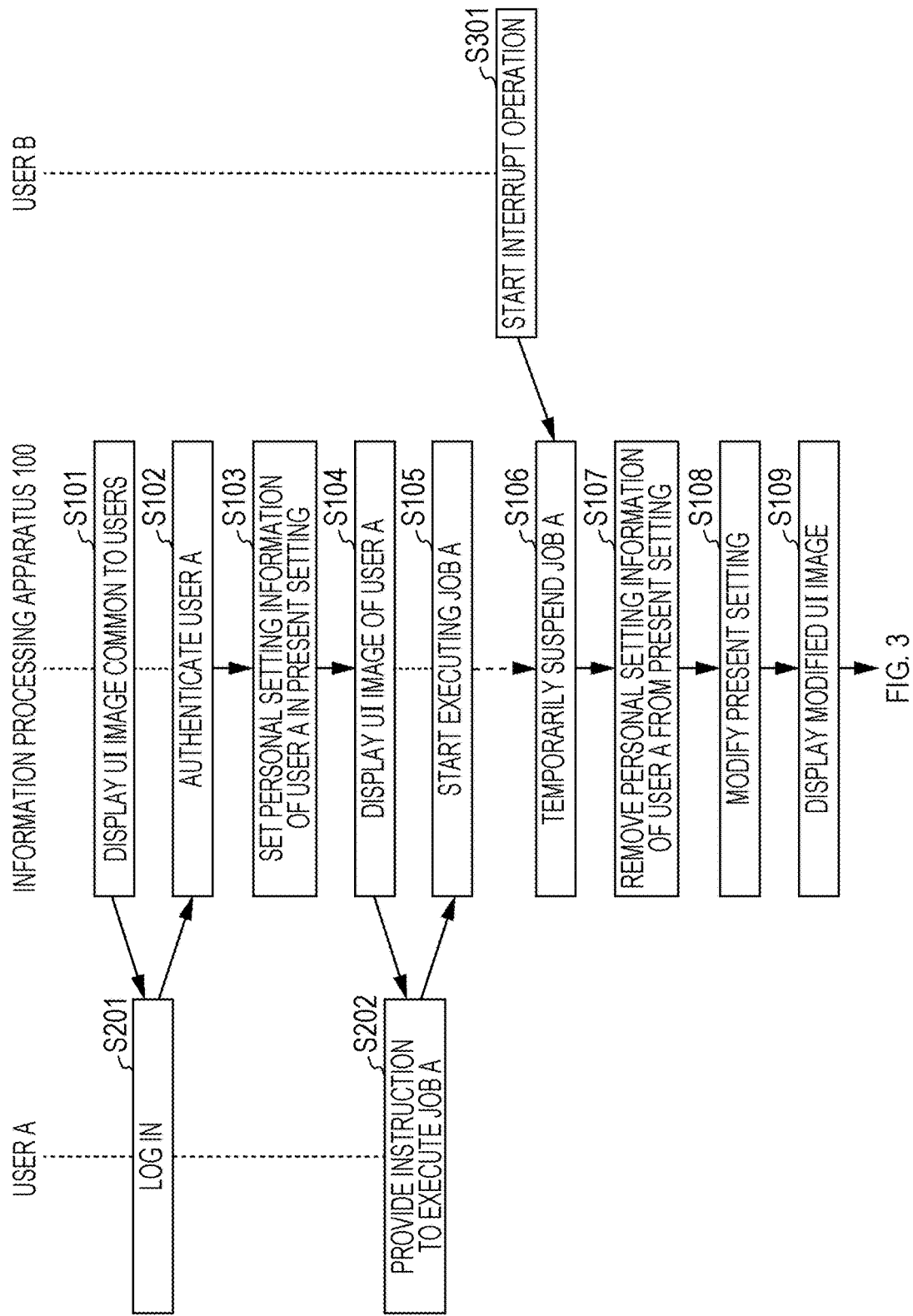
FIG. 2 illustrates a usage example of the information processing apparatus.
Figure 3:
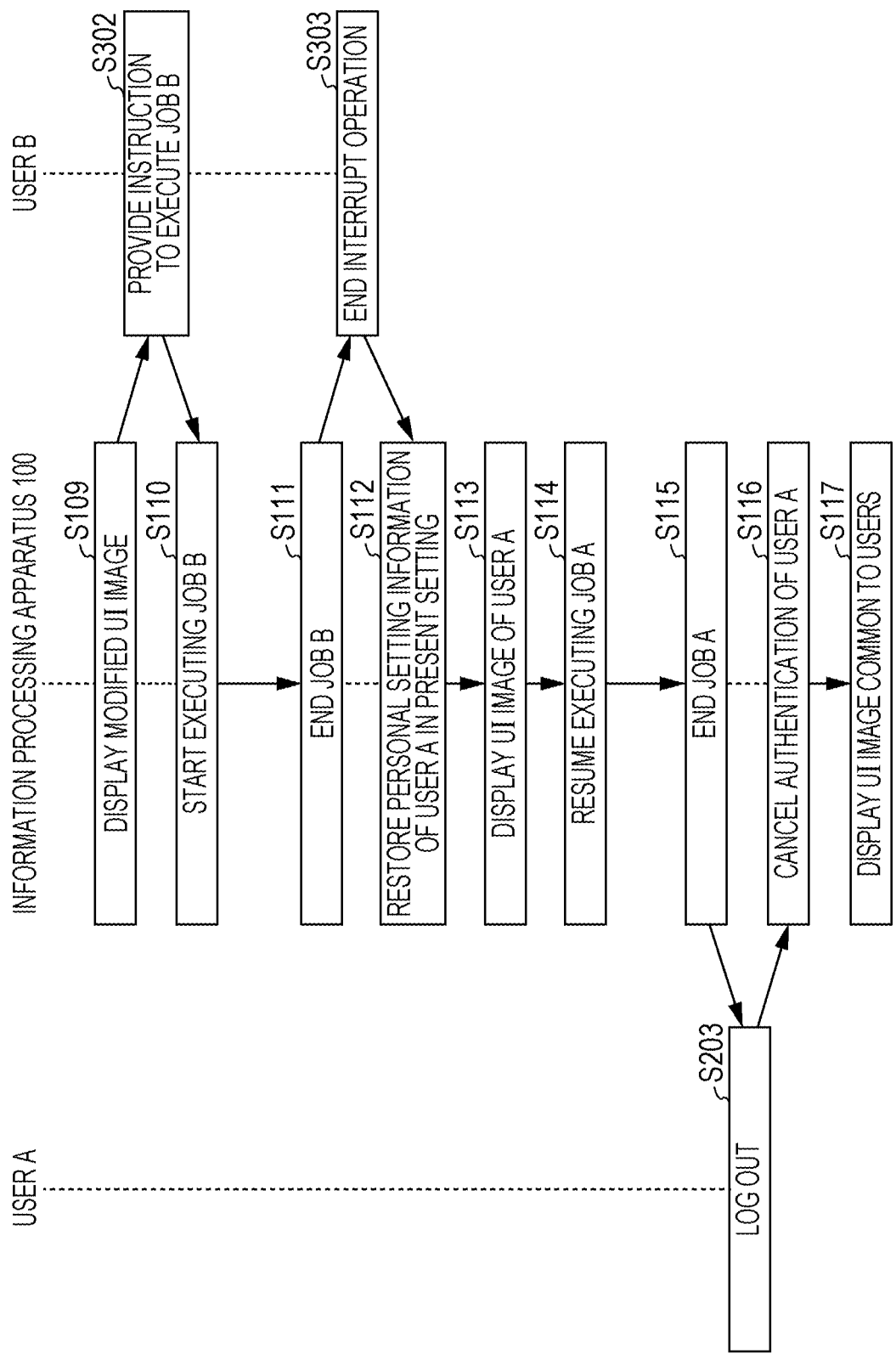
FIG. 3 illustrates a usage example of the information processing apparatus.

FIGS. 2 and 3 illustrate the process of the information processing apparatus 100 in FIG. 1. Referring to FIGS. 2 and 3, a user A as the first user and a user B as the second user use the information processing apparatus 100 in FIG. 1.

The information processing apparatus 100 in FIG. 1 has an interrupt function that, while one job is being performed in response to an execution instruction received previously, is able to receive an execution instruction for another job. FIGS. 2 and 3 illustrate the usage examples of the interrupt function.

In the usage examples in FIGS. 2 and 3, the information processing apparatus 100 displays a user interface image common to users (S101). For example, the user interface image not specific to a particular user but common to multiple users are displayed on the display 32 in the information processing apparatus 100.

The user A logs in on the information processing apparatus 100 (S201). The user A inputs information for login on the information processing apparatus 100 by using the user interface image common to users displayed on the display 32 in the information processing apparatus 100. If the information processing apparatus 100 includes a device that reads card information, the user A holds an authentication card for login over the device and the information processing apparatus 100 acquires information for the login from the authentication card.

When the user A has performed the login operation, the information processing apparatus 100 performs an authentication operation for the user A (S102). For example, the authentication processing unit 16 in the information processing apparatus 100 performs the authentication operation by comparing input information for authentication obtained from the user A with pre-registered authentication information. The authentication processing unit 16 thus determines whether the user A is a pre-registered and authorized user having the right to use the information processing apparatus 100.

if it is determined in the authorization operation that the user A is not the authorized user, the information processing apparatus 100 may display on the display 32 a screen image indicating that the user A is not permitted to log in.

If it is determined in the authorization operation that the user A is the authorized user, the personal setting information on the user A is set in the present setting on the information processing apparatus 100 (S103). For example, the setting processing unit 10 in the information processing apparatus 100 stores and thus sets on the present setting memory 12 the personal setting information on the user A that is managed by the personal information management unit 14 in the present setting on the information processing apparatus 100. The personal setting information on the user A may be acquired from a management server external to the information processing apparatus 100 and may then be stored onto the present setting memory 12.

The information processing apparatus 100 displays the user interface image of the user A (S104). By using the personal setting information on the user A set in the present setting, the information processing apparatus 100 forms the user interface image specific to the user A (for example, the user interface image personalized to the user A) and then displays the user interface image on the display 32.

The user A provides an execution instruction for a job A (S202). For example, the user A instructs the information processing apparatus 100 to perform the job A by using the user interface image of the user A displayed on the information processing apparatus 100. In response to the execution instruction for the job A, the information processing apparatus 100 starts executing the job A (S105).

In a specific example in FIG. 2, the user B initiates an interrupt (S301) during a time period from the start of the job A to the end of the job A on the information processing apparatus 100 (S301). The image processing apparatus having the functions of the information processing apparatus 100 may now receive and execute a print job of several hundreds of pages as the job A. It may take several minutes to several tens of minutes for the information processing apparatus 100 to complete the job A. For example, the user B authorized by the user A may initiate an interrupt by operating an interrupt button on the information processing apparatus 100 that is currently performing the user A.

When the user B initiates the interrupt, the information processing apparatus 100 is forced to suspend the user A (S106). For example, the print job of several hundreds of pages is being performed as the job A and the print operation responsive to the print job is temporarily suspended.

The information processing apparatus 100 removes at least part of the personal setting information on the user A from the present setting (S107). For example, if the user B initiates the interrupt, the user determination unit 20 in the information processing apparatus 100 determines that the second user is about to use the information processing apparatus 100 during the time period throughout which the personal setting information on the first user is present in the present setting on the information processing apparatus 100. The setting processing unit 10 in the information processing apparatus 100 transfers to the personal information management unit 14 at least part of the personal setting information on the user A stored on the present setting memory 12 in the present setting and then deletes at least part of the personal setting information on the user A on the present setting memory 12. At least the part of the personal setting information on the user A removed in S107 is thus in a state that is unable to be used as the present setting.

The information processing apparatus 100 may remove, from the present setting secret, secret information determined to have a higher degree of secrecy out of the personal setting information on the user A. For example, if destination information is included in the personal setting information on the user A, the secret information such as the destination information may be removed from the present setting.

The information processing apparatus 100 may remove information selected by the second user from the present setting as at least part of the personal setting information on the first user. For example, the information processing apparatus 100 may remove, from the present setting, information that the second user does not desire to use out of the personal setting information on the first user, and leaves, in the present setting, information that the first user permits the second user to use.

The information processing apparatus 100 may modify at least part of the present setting (S108). For example, the information processing apparatus 100 may use setting information common to multiple users as the present setting in place of at least part of the personal setting information on the user A removed from the present setting. For example, if the personal setting information on the user A includes language information and the language information is removed from the present setting, the setting information common to the users may be used as the present setting in place of the removed language information. Note that keyboard layout information included in the personal setting information in the present setting may be modified.

The information processing apparatus 100 displays a modified user interface image (S109). For example, at least part of the personal setting information on the user A is removed. By using part of the present setting modified as appropriate, the information processing apparatus 100 forms and displays the modified user interface image on the display 32.

The language information included in the personal setting information on the user A is removed from the present setting and language information common to multiple user is used as the present setting in place of the removed language information. The modified user interface image may be formed in a language corresponding to the common language information.

if the modified user interface image is displayed as illustrated in FIG. 3 (S109), the user B provides an execution instruction for a job B (S302). The user B provides the execution instruction for the job B to the information processing apparatus 100 by using the modified user interface image displayed on the information processing apparatus 100. Upon receiving the execution instruction for the job B, the information processing apparatus 100 starts executing the job B (S110).

In the specific examples in FIGS. 2 and 3, execution time from the start to the end of the job A is shorter than execution time from the start to the end of the job B. For example, if the job A performed by the image processing apparatus having the functions of the information processing apparatus 100 is a print job of several hundreds of pages, the specific example of the job B is a copy job of several pages.

Referring to FIG. 3, the job B is complete (S111) several seconds to several minutes after when the information processing apparatus 100 starts the job B (S110). When the job B is complete, the user B performs an interrupt end operation (S303). After confirming that the job B is complete, the user B selects an interrupt button to instruct the information processing apparatus 100 to end the interrupt.

When the user B performs the interrupt end operation, the information processing apparatus 100 restores the personal setting information on the user A to the present setting (S112). For example, the setting processing unit 10 in the information processing apparatus 100 stores again in the present setting on the present setting memory 12 at least part of the personal setting information on the user A, transferred to the personal information management unit 14 and deleted from the present setting memory 12. In this way, the present setting set in S103 (FIG. 2) is thus restored.

The information processing apparatus 100 displays the user interface image of the user A (S113). For example, by using the personal setting information on the user A restored in the present setting, the information processing apparatus 100 forms and displays the user interface image personalized to the user A on the display 32. The user interface image displayed in S104 (FIG. 2) is thus displayed again.

The information processing apparatus 100 resumes the job A (S114). In this case, the information processing apparatus 100 may resume the job A after the user A performs a resume operation.

The job A resumes, is in progress, and is complete (S115). The user A then performs a logout operation (S203). After confirming the end of the job A, the user A performs an operation for the logout on the information processing apparatus 100 by using the user interface image of the user A displayed on the information processing apparatus 100.

When the user A has performed the logout operation, the information processing apparatus 100 cancels the authentication of the user A (S116). In response to the cancellation of the authentication of the user A, the setting processing unit 10 in the information processing apparatus 100 may delete the personal setting information on the user A stored on the present setting memory 12 as the present setting on the information processing apparatus 100. Even if the user A has not performed the logout operation, the information processing apparatus 100 may cancel the authentication of the user A when a predetermined time period has elapsed since the end of the job A.

When the authentication of the user A has been canceled, the information processing apparatus 100 displays the user interface image common to users (S117). For example, the user interface image displayed in S101 (FIG. 2) is displayed again. The usage examples in FIGS. 2 and 3 are thus complete.

In the usage examples in FIGS. 2 and 3, the interrupt initiated by the user B causes the user determination unit 20 to determine that the user B is about to use the information processing apparatus 100. In this determination, the user determination unit 20 may use detection results provided by the user detecting unit 22 in place of or in addition to the interrupt initiation operation.

From a user who is about to use the information processing apparatus 100, the user detecting unit 22 detects feature information unique to the user. For example, from the user who is present in a detection target area set around the information processing apparatus 100, the user detecting unit 22 detects the feature information on the user. If the user detecting unit 22 detects the feature information on a user different from the first user, the user determination unit 20 may determine that the second user is about to use the information processing apparatus 100. When the user detecting unit 22 determines that the second user is about to use the information processing apparatus 100, at least part of the personal setting information on the first user is removed from the present setting.

Even if the second user different from the first user is an unscrupulous person, the second user is restricted in his or her use of at least part of the personal setting information on the first user set in the present setting.

The user detecting unit 22 may include a human sensor. Video obtained from the human sensor having the function of camera may be analyzed and the feature information unique to the user may be detected from the user who is about to use the information processing apparatus 100. For example, if the information processing apparatus 100 includes an operation device, such as a touch panel, the human sensor having the camera function may detect a user who is present in an area where the operation device is within the reach of the user. The feature information unique to the user may be detected by using a sensor that detects fingerprint or a voice.

Figure 4:
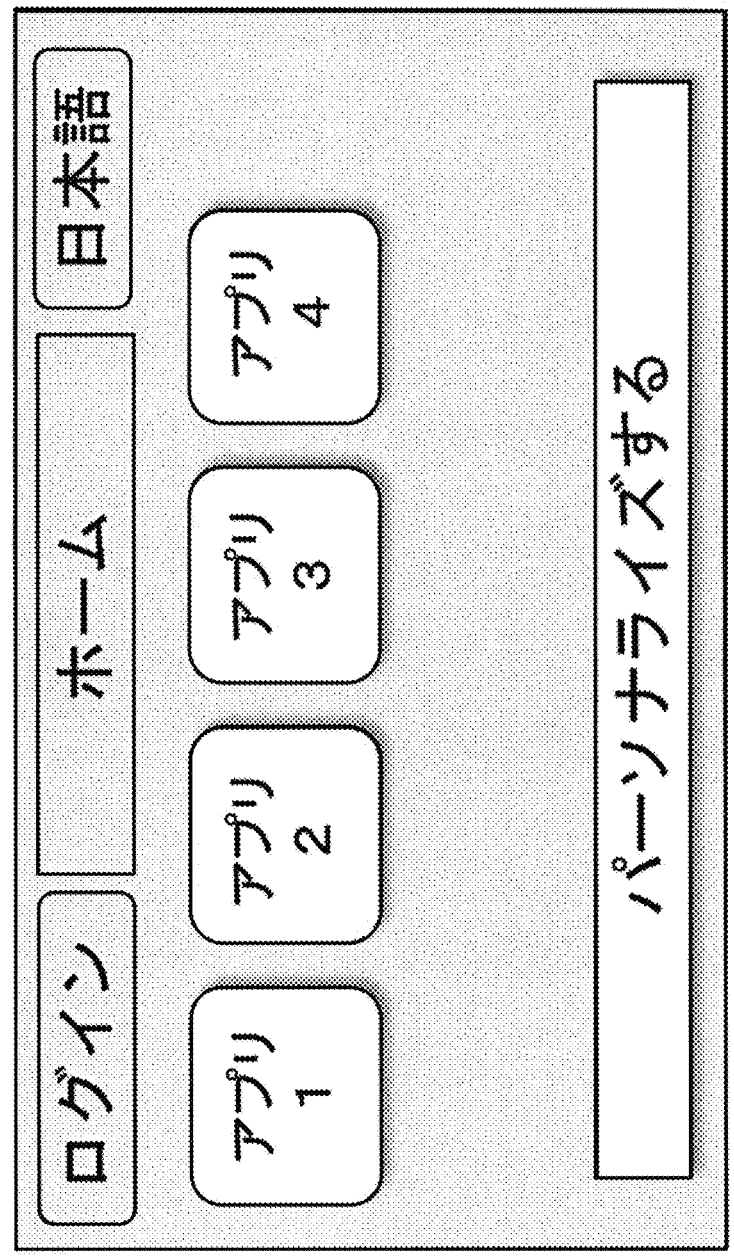
FIG. 4 specifically illustrates a user interface image common to users.
Figure 5:
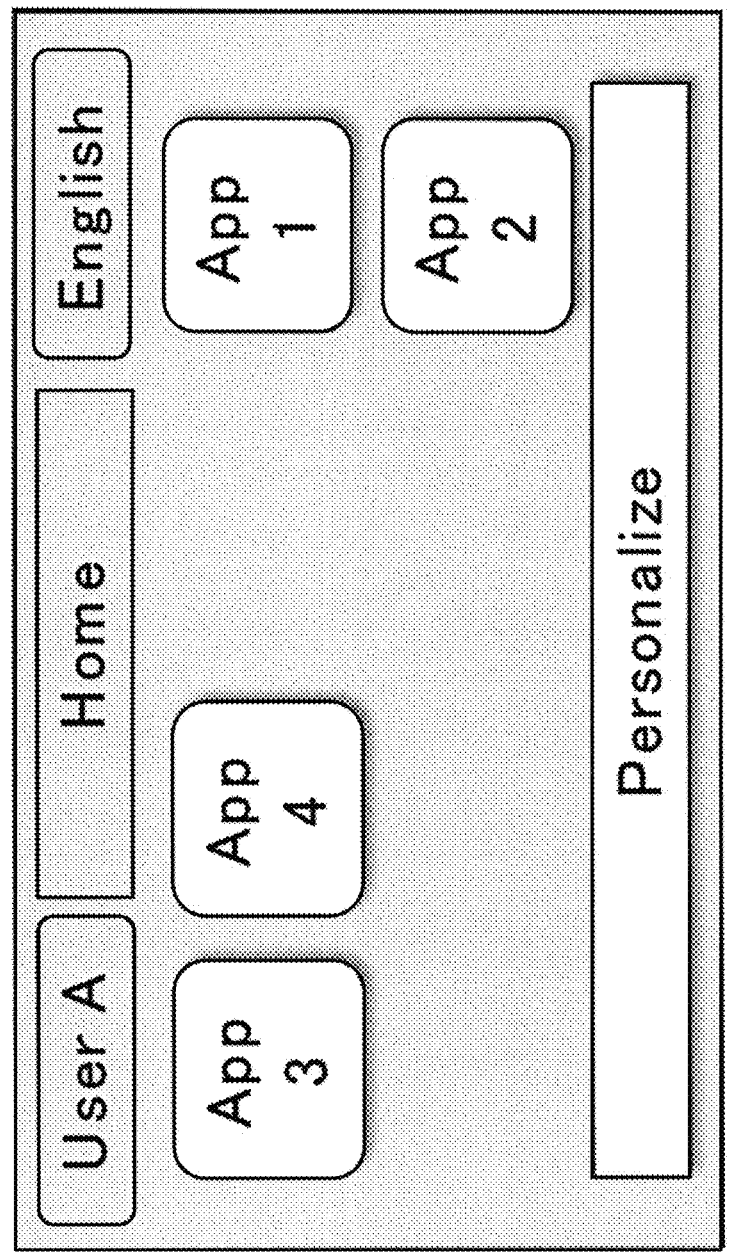
FIG. 5 illustrates an example of the user interface image specific to a user.
Figure 6:
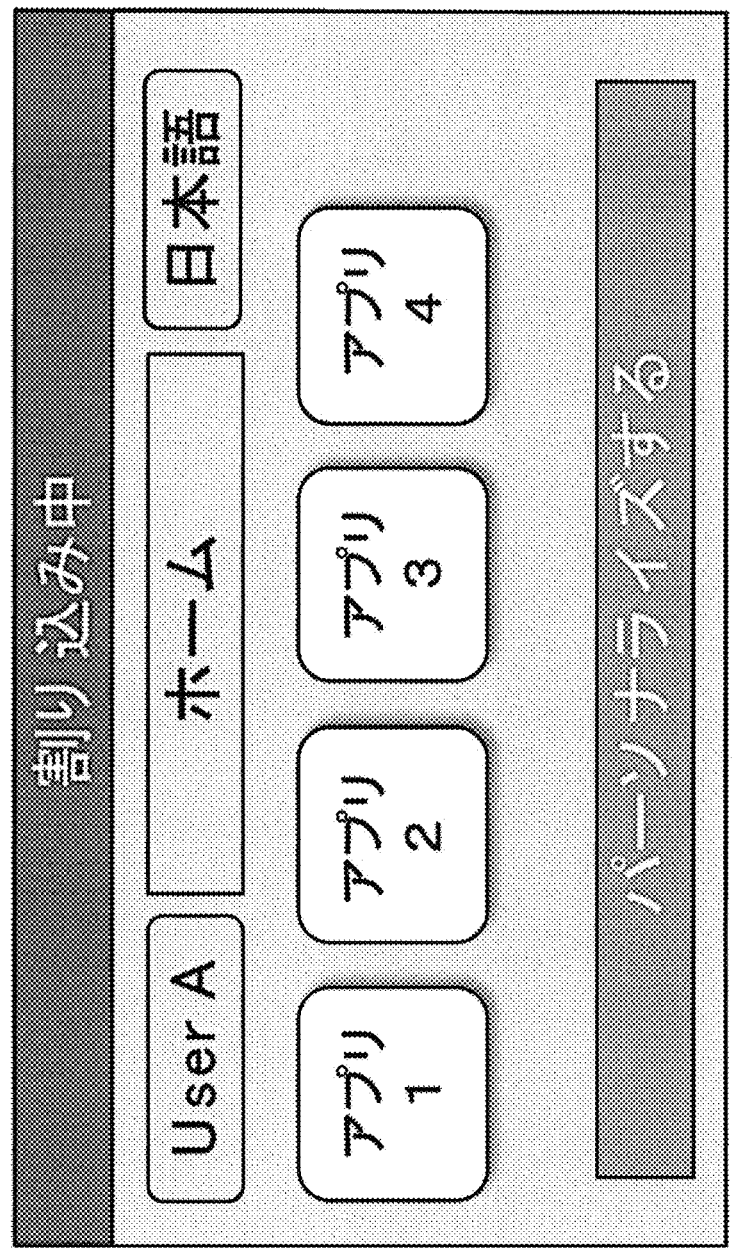
FIG. 6 illustrates an example of the user interface image in an interrupt operation.

FIGS. 4 through 6 illustrate the user interface images common to the users displayed on the display 32 in the information processing apparatus 100 in FIG. 1. The user interface images in FIGS. 4 through 6 is formed by using personalization information that is an example of the personal setting information.

FIG. 4 illustrates the user interface image that is common to the users and is not personalized to a particular user. The specific user interface image in FIG. 4 indicates that the language setting is "日本語" (Japanese).

For example, if most of the users who are about to use the information processing apparatus 100 are Japanese, the user interface image in FIG. 4 may be displayed in the operation in S101. In the operation in S201 illustrated in FIGS. 2 and 3, the login operation using a "ログイン" (login) button displayed on the user interface image in FIG. 4 may be executed.

FIG. 5 specifically illustrates the user interface image specific to a user. FIG. 5 thus illustrates the user interface image specific to a particular user (the user interface image personalized to the particular user). The user interface image in FIG. 5 displays a language setting "English".

If the language setting including the personal setting information on the user A is English in the usage examples in FIGS. 2 and 3, the user interface image in FIG. 5 may be displayed as the user interface image of the user A in S104.

In the operation in S202 in FIGS. 2 and 3, one of "application (App)" buttons displayed on the user interface image in FIG. 5 may be used to execute the job A.

The user interface image specific to the user may be customized to the user. For example, if the image in FIG. 5 is the user interface image of the user A, the user A may modify the image configuration of the user interface image in FIG. 5, for example, the layout of the application (App) buttons and the language setting.

For example, the user A may modify the personal setting information including the image configuration of the user interface image and the language setting to as desired by the user A and operates the personalization (personalize) button in the user interface image in FIG. 5. The personal setting information on the user A may be modified to the desired version of the user A.

The user interface image may be customized on a per application basis. For example, one of the application (App) buttons included in the user interface image in FIG. 5 is selected and the user interface image of the application corresponding to the selected button is displayed. By using that user interface image, the user A may modify the image configuration of the user interface image and the function of the application.

FIG. 6 specifically illustrates the user interface image in an interrupt operation. For example, in the usage examples in FIGS. 2 and 3, the user B initiates an interrupt while the job A of the user A is in progress, and the language setting is changed from English to Japanese in S108. In the operation in S109, the user interface image in FIG. 6 may thus be displayed as a modified user interface image.

The example in FIG. 6 indicates, with the top Japanese message, that the information processing apparatus 100 is in an interrupt operation and also indicates a user name "User A" who has been authenticated and has logged in on the information processing apparatus 100.

In the user interface image in FIG. 6, updating of the personal setting information on the user A who has logged in on the information processing apparatus 100 is restricted. Referring to FIG. 6, the bottom Japanese button indicating "PERSONALIZE", included the user interface image, is grayed out and the operation of the bottom Japanese button is thus invalidated. In this way, the user B is thus restricted in updating of the personal setting information on the user A. The user B may thus be prohibited from updating the personal setting information. If the user A permits the user B to update the personal setting information, the user B may be restricted in the updating.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus, comprising:
a processor programmed to:
set personal setting information on a first user as a present setting of the information processing apparatus, the present setting being used to form a customized user interface of the information processing apparatus;
during a time period while the customized user interface is formed based on the personal setting information of the first user,
receive a request for a job from the first user; and
after the job is started by the information processing apparatus and before completion of the job, detect a second user, different from the first user, approaching the information processing apparatus and determine that the second user is about to use the information processing apparatus; and
in response to the determination that the second user is about to use the information processing apparatus, suspend the job requested from the first user; and remove at least part of the personal setting information on the first user from the present setting and display a modified customized user interface that is formed based on the personal setting information of the first user without the at least part thereof.

2. The information processing apparatus according to claim 1, wherein secret information determined to be information having a higher degree of secrecy out of the personal setting information on the first user is removed from the present setting in response to the determination indicating that the second user is about to use the information processing apparatus during the time period.

3. The information processing apparatus according to claim 2, wherein destination information included in the personal setting information on the first user and serving as the secret information is removed from the present setting in response to the determination indicating that the second user is about to use the information processing apparatus during the time period.

4. The information processing apparatus according to claim 3, wherein setting information common to a plurality of users is used as the present setting in place of the at least part of the personal setting information removed from the present setting.

5. The information processing apparatus according to claim 4, wherein language information included in the personal setting information as the at least part of the personal setting information on the first user is removed from the present setting in response to the determination indicating that the second user is about to use the information processing apparatus during the time period and language information common to the users is used as the present setting in place of the removed language information.

6. The information processing apparatus according to claim 3, wherein information that is selected by the second user as the at least part of the personal setting information on the first user is removed from the present setting in response to the determination indicating that the second user is about to use the information processing apparatus during the time period.

7. The information processing apparatus according to claim 3, wherein updating of the personal setting information on the first user is restricted in response to the determination indicating that the second user is about to use the information processing apparatus during the time period.

8. The information processing apparatus according to claim 3, further comprising a detector that detects, from a user, feature information unique to the user who is using the information processing apparatus,
wherein if the detector has detected the feature information on a user different from the first user during the time period, a determination is made that the second user is about to use the information processing apparatus.

9. The information processing apparatus according to claim 2, wherein setting information common to a plurality of users is used as the present setting in place of the at least part of the personal setting information removed from the present setting.

10. The information processing apparatus according to claim 9, wherein language information included in the personal setting information as the at least part of the personal setting information on the first user is removed from the present setting in response to the determination indicating that the second user is about to use the information processing apparatus during the time period and language information common to the users is used as the present setting in place of the removed language information.

11. The information processing apparatus according to claim 2, wherein information that is selected by the second user as the at least part of the personal setting information on the first user is removed from the present setting in response to the determination indicating that the second user is about to use the information processing apparatus during the time period.

12. The information processing apparatus according to claim 2, wherein updating of the personal setting information on the first user is restricted in response to the determination indicating that the second user is about to use the information processing apparatus during the time period.

13. The information processing apparatus according to claim 2, further comprising a detector that detects, from a user, feature information unique to the user who is using the information processing apparatus,
wherein if the detector has detected the feature information on a user different from the first user during the time period, a determination is made that the second user is about to use the information processing apparatus.

14. The information processing apparatus according to claim 1, wherein setting information common to a plurality of users is used as the present setting in place of the at least part of the personal setting information removed from the present setting.

15. The information processing apparatus according to claim 14, wherein language information included in the personal setting information as the at least part of the personal setting information on the first user is removed from the present setting in response to the determination indicating that the second user is about to use the information processing apparatus during the time period and language information common to the users is used as the present setting in place of the removed language information.

16. The information processing apparatus according to claim 1, wherein information that is selected by the second user as the at least part of the personal setting information on the first user is removed from the present setting in response to the determination indicating that the second user is about to use the information processing apparatus during the time period.

17. The information processing apparatus according to claim 1, wherein updating of the personal setting information on the first user is restricted in response to the determination indicating that the second user is about to use the information processing apparatus during the time period.

18. The information processing apparatus according to claim 1, further comprising a detector that detects, from a user, feature information unique to the user who is using the information processing apparatus,
wherein if the detector has detected the feature information on a user different from the first user during the time period, a determination is made that the second user is about to use the information processing apparatus.

19. The information processing apparatus according to claim 1, wherein the processor is further programmed to:
receive a request for another job from the second user on the modified customized user interface;
in response to determining that the another job requested from the second user is completed, automatically restore the present setting of the information processing apparatus to the personal setting information of the first user including the at least part thereof; and
resume the job from the first user.

20. A non-transitory computer readable medium storing a program causing a computer to execute a process for processing information, the process comprising:
setting personal setting information on a first user as a present setting of an information processing apparatus, the present setting being used to form a customized user interface of the information processing apparatus;
during a time period while the customized user interface is formed based on the personal setting information of the first user,
receiving a request for a job from the first user; and
after the job is started by the information processing apparatus and before completion of the job, detecting a second user, different from the first user, approaching the information processing apparatus and determining that the second user is about to use the information processing apparatus; and
in response to the determination that the second user is about to use the information processing apparatus,
suspending the job requested from the first user; and
removing at least part of the personal setting information on the first user from the present setting and displaying a modified customized user interface that is formed based on the personal setting information of the first user without the at least part thereof.

21. An information processing apparatus, comprising:
means for setting personal setting information on a first user as a present setting of the information processing apparatus, the present setting being used to form a customized user interface of the information processing apparatus;
means for, during a time period while the customized user interface is formed based on the personal setting information of the first user,
receiving a request for a job from the first user; and
after the job is started by the information processing apparatus and before completion of the job, detecting a second user, different from the first user, approaching the information processing apparatus and determining that the second user is about to use the information processing apparatus; and
means for, in response to the determination that the second user is about to use the information processing apparatus,
suspending the job requested from the first user; and
removing at least part of the personal setting information on the first user from the present setting and displaying a modified customized user interface that is formed based on the personal setting information of the first user without the at least part thereof.

* * * * *